United States Patent
Fujiwara et al.

(10) Patent No.: US 7,056,247 B2
(45) Date of Patent: Jun. 6, 2006

(54) PULLEY UNIT

(75) Inventors: Hideki Fujiwara, Osaka (JP);
Takahiro Ichihara, Osaka (JP);
Tadahiro Terada, Osaka (JP); Michiru Ueda, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/089,015

(22) PCT Filed: Jul. 27, 2001

(86) PCT No.: PCT/JP01/06491

§ 371 (c)(1),
(2), (4) Date: Mar. 25, 2002

(87) PCT Pub. No.: WO02/10617

PCT Pub. Date: Feb. 7, 2002

(65) Prior Publication Data

US 2002/0134974 A1   Sep. 26, 2002

(30) Foreign Application Priority Data

Jul. 27, 2000 (JP) ............................. 2000-226636
Dec. 22, 2000 (JP) ............................. 2000-390263

(51) Int. Cl.
*F16H 55/36* (2006.01)
*F16H 7/20* (2006.01)

(52) U.S. Cl. .................... 474/199; 474/70; 474/166

(58) Field of Classification Search ............... 474/70, 474/170, 199, 169, 74–77, 166; 384/587, 384/588, 546, 547, 449, 462, 473, 470, 480; 192/45.1, 64, 110 B; 123/192.1
See application file for complete search history.

(56) References Cited

U.S. PATENT DOCUMENTS

| 1,583,276 | A | * | 5/1926 | Brown et al. ............... 384/588 |
| 4,073,552 | A | * | 2/1978 | Christy ........................ 384/470 |
| 4,571,227 | A | * | 2/1986 | Colanzi et al. ............. 474/199 |
| 5,515,957 | A | * | 5/1996 | McConaghy .................. 192/64 |
| 5,517,957 | A | * | 5/1996 | Wagner et al. ........... 123/192.1 |
| 5,607,240 | A | * | 3/1997 | Kajihara et al. ............. 384/480 |
| 6,257,385 | B1 | * | 7/2001 | Ouchi ......................... 192/45 |
| 6,367,982 | B1 | * | 4/2002 | Doi et al. .................... 384/463 |
| 6,471,023 | B1 | * | 10/2002 | Nagaya et al. ............. 192/45.1 |

FOREIGN PATENT DOCUMENTS

| DE | 4322554 A1 | * | 1/1995 |
| FR | 2686381 A1 | * | 7/1993 |
| GB | 2330884 A | * | 5/1999 |

(Continued)

*Primary Examiner*—Marcus Charles
(74) *Attorney, Agent, or Firm*—Jordan and Hamburg LLP (57) ABSTRACT

A pulley unit includes a pulley and a rotor concentrically disposed for relative rotation, a one-way clutch interposed in an annular space therebetween, rolling bearings provided on opposite sides of the one-way clutch, and a seal ring for sealing the annular space. An inner diametrical surface of the pulley forms an outer ring raceway of the one-way clutch and the rolling bearing, and an outer diametrical surface of the shaft body forms an inner ring raceway of the one-way clutch and the rolling bearing. An outer diameter side of an annular portion of a retainer of the rolling bearing on the side of the seal ring is reduced so as to increase a storage volume of lubricating oil between the rolling bearing and the seal ring.

21 Claims, 7 Drawing Sheets

FOREIGN PATENT DOCUMENTS

| | | |
|---|---|---|
| JP | 7-253113 | 10/1995 |
| JP | 8-170641 | 7/1996 |
| JP | 9-151946 | 6/1997 |
| JP | 10-213207 | 8/1998 |
| JP | (11-82688 A * | 3/1999 |
| JP | 2000-130563 | 5/2000 |
| JP | (2001-4011 A * | 1/2001 |

* cited by examiner

PULLEY UNIT

TECHNICAL FIELD

The present invention relates to a pulley unit having a one-way clutch. The pulley unit can be mounted in an auxiliary machine which is driven by a crankshaft of an engine of an automobile or the like through a belt. Examples of the auxiliary machine are an air conditioner compressor, a water pump, an alternator, a cooling fan and the like of an automobile.

BACKGROUND TECHNIQUE

Various auxiliary machines mounted in automobile engines are driven by crankshafts of engines through belts. For example, when an alternator is connected to a crankshaft of the engine such that the alternator rotates in synchronization with the crankshaft, if the number of rotation of the crankshaft is lowered, electric power generation ability is lowered.

Thereupon, there is proposed a pulley unit in which a one-way clutch is incorporated in the pulley of the alternator, and when the number of rotation of the crankshaft is lowered, the rotation of a rotor of the alternator is continued by inertial force thereof so that electric power generation efficiency is enhanced.

In this pulley unit, the one-way clutch is interposed in an annular space between the pulley and the rotor of the alternator, the one-way clutch is switched between a lock state (power transmitting state) and a free state (power transmission cutting state) corresponding to a difference of rotation between the pulley and rotor, so that power is transmitted or cut between the pulley and the rotor.

The present inventor has considered a pulley unit in which rolling bearings are provided on opposite sides of the one-way clutch in an annular space between the pulley and the rotor, axially opposite ends of the annular space are sealed by means of seal rings, and lubricating oil such as grease is held in the annular space.

As the number of electrical components in an automobile is further increased, the alternator is required to enhance the electric power generation ability. On the other hand, the reduction of the size and weight of the alternator disposed around the automobile engine is also required.

Therefore, under present circumstances, it is difficult to secure wide annular space capable of holding sufficient amount of lubricating oil for lubricating raceways of inner and outer rings of the one-way clutch or the rolling bearing when the pulley unit is used in the alternator.

When the space for holding lubricating oil is small, if the lubricating oil moves toward an outer diameter side by rotation centrifugal force caused by relative rotation of the pulley or the rotor, the holding space of the annular space on the outer diameter side is reduced. As a result, lubricating oil is not held and is prone to leak outside through the seal ring, and an amount of lubricating oil is decreased. This results in that an amount of lubricating oil which is repeatedly used in the raceways of the inner and outer rings is increased, and the lubricating oil is prone to be deteriorated.

Accordingly, it is an object of the present invention to provide a pulley unit having an annular space capable of holding lubricating oil for eliminating environment in which the lubricating oil is prone to be deteriorated and for enhancing performance thereof.

DISCLOSURE OF THE INVENTION

A pulley unit of the present invention comprises a pulley and a shaft body. The shaft body is concentrically disposed in an inner diameter side of the pulley and in a relatively rotatable relationship with the pulley. The pulley unit further comprises a one-way clutch, a rolling bearing and seal rings. The one-way clutch is interposed in an annular space between an inner diametrical surface of the pulley and an outer diametrical surface of the shaft body. The rolling bearing is set in the annular space on at least axially one side of the one-way clutch. The seal rings each are disposed on each of axially one end and axially other end of the annular space for sealing the annular space.

The inner diametrical surface of the pulley forms an outer ring raceway of each of the one-way clutch and the rolling bearing, and the outer diametrical surface of the shaft body forms an inner ring raceway of each of the one-way clutch and the rolling bearing.

Each of the one-way clutch and the rolling bearing includes a plurality of rolling elements interposed between the outer ring raceway and the inner ring raceway in the circumferential direction, and includes a retainer having a plurality of pockets each accommodating the rolling elements one each.

The retainer of the rolling bearing has an annular portion facing to one of said seal rings. The annular portion has an outer diameter side reduced in diameter so as to increase a storage volume for lubricating oil between the rolling bearing and said seal rings.

The shaft body includes an input shaft of an auxiliary machine of an automobile, or a portion of the input shaft. In short, only if the shaft body is concentrically disposed in an inner diameter side of the pulley for the relative rotation, the shaft body includes all of a hollow structure, a partially hollow structure, a solid structure, a double shaft structure and the like.

In the case of the present invention, the inner diametrical surface of the pulley forms the outer ring raceway of the one-way clutch and the rolling bearing, and the outer diametrical surface of the shaft body forms an inner ring raceway of the one-way clutch and the rolling bearing. Therefore, the inner ring and the outer ring can be omitted from the one-way clutch and the rolling bearing. With this, the pulley unit can have wider annular space which holds the lubricating oil, even if the outer diameter size is the same.

In the case of the present invention, the outer diameter of the annular portion of the retainer of the rolling bearing on the side of the seal ring is reduced so as to increase the storage volume of lubricating oil between the rolling bearing and the seal ring.

With this, the storage space for the lubricating oil of the annular space, especially on the side of its outer diameter portion is widened, and it is possible to hold and store more lubricating oil. With this feature, it is possible to restrain leakage of the lubricating oil to outside and as a result, an environment in which the lubricating oil is prone to be deteriorated is eliminated, and the ability of the pulley unit can be enhanced.

As a preferable embodiment of the invention, the rolling bearing comprises a roller bearing, a retainer for holding the rolling element provided in the roller bearing is reduced in outer diameter of an annular portion on the side of the seal ring.

Further, as a preferable embodiment of the invention, the inner diametrical surface of the pulley between the one-way clutch and the rolling bearing is provided with a recess which increases the storage volume of the lubricating oil in the annular space.

In this case, the lubricating oil which moved toward the outer diameter side of the annular space by the rotation centrifugal force caused by rotation of the pulley or the shaft body can be stored also in the recess. As a result, more lubricating oil can be held and stored and thus, it is possible to restrain the lubricating oil from leaking outside. At the same time, the environment in which the lubricating oil is prone to be deteriorated is eliminated, and the ability of the pulley unit can be enhanced. Further, the lubricating oil stored in the recess which increases the storage volume of the lubricating oil in the annular space can lubricate the outer ring raceway efficiently. With this, it is possible to more effectively restrain the wear of the outer ring raceway.

As further preferable embodiment of the invention, the rolling bearing comprises a ball bearing, and a retainer provided in the ball bearing is formed into a taper structure in which its inner diameter of an annular portion on the side of the seal ring is gradually increased toward the axially outer end.

In this case, the lubricating oil located on the inner diameter side between the seal ring and the ball bearing moves toward the outer diameter side of the annular space by the rotation centrifugal force which is caused by rotation of the pulley or the shaft body, and at that time, the lubricating oil is moved toward the outer diameter side smoothly by the taper structure of the inner diameter side of the retainer, and the lubricating oil is stored smoothly into the storage space which was increased by the outer diameter side. As a result, it is possible to more effectively prevent the lubricating oil from leaking from the seal ring, the environment in which the lubricating oil is prone to be deteriorated is eliminated, and the ability of the pulley unit can be enhanced.

As a preferable embodiment of the invention, the retainer of the ball bearing is formed into a taper structure in which its outer diameter of the annular portion on the side of the seal ring is gradually reduced toward the axial outer end.

In this case, the lubricating oil can be smoothly stored into the storage space which was increased by the outer diameter side together with the taper structure of the inner diameter side of the retainer. As a result, it is possible to more effectively prevent the lubricating oil from leaking from the seal ring.

As a further preferable embodiment of the invention, the rolling element of the rolling bearing is made of resin having lubricating oil. A lubricating oil impregnating body is accommodated in the pockets of retainers of the one-way clutch and the rolling bearing.

The pocket is in the space surrounded by the inner ring and the outer ring of the rolling bearing or the one-way clutch and thus, when the rolling element or the lubricating oil impregnating body made of resin including lubricating oil is accommodated in the pocket, the lubricating oil is stored in excellent state for a long term.

Therefore, when such an embodiment is employed, the storage space for the lubricating oil is increased by the diameter side which increases the storage volume of the lubricating oil in the retainer, and in addition to the effect that more lubricating oil can be held and stored, it is possible to continuously and stably supply the lubricating oil to the wide storage space from the resin having the lubricating oil accommodated in the pocket. With this feature, the lubricating effect can further be enhanced and thus, the ability of the pulley unit can be enhanced.

As a further preferable embodiment of the invention, the lubricating oil impregnating body is accommodated in the recess formed in the inner diametrical surface of the pulley between the one-way clutch and the rolling bearing.

As described above, it is possible for the recess to hold and store more lubricating oil which moved toward the outer diameter side of the annular space by the rotation centrifugal force caused by the relative rotation between the pulley and the rotor. In addition, if the lubricating oil impregnating body is accommodated in the recess, it is possible to continuously and stably supply the lubricating oil to the storage space from the lubricating oil impregnating body even if lubricating oil is exhausted. With this feature, the lubricating effect can further be enhanced and thus, the ability of the pulley unit can be enhanced.

BEST MODE FOR CARRYING OUT THE INVENTION

Figure 1:
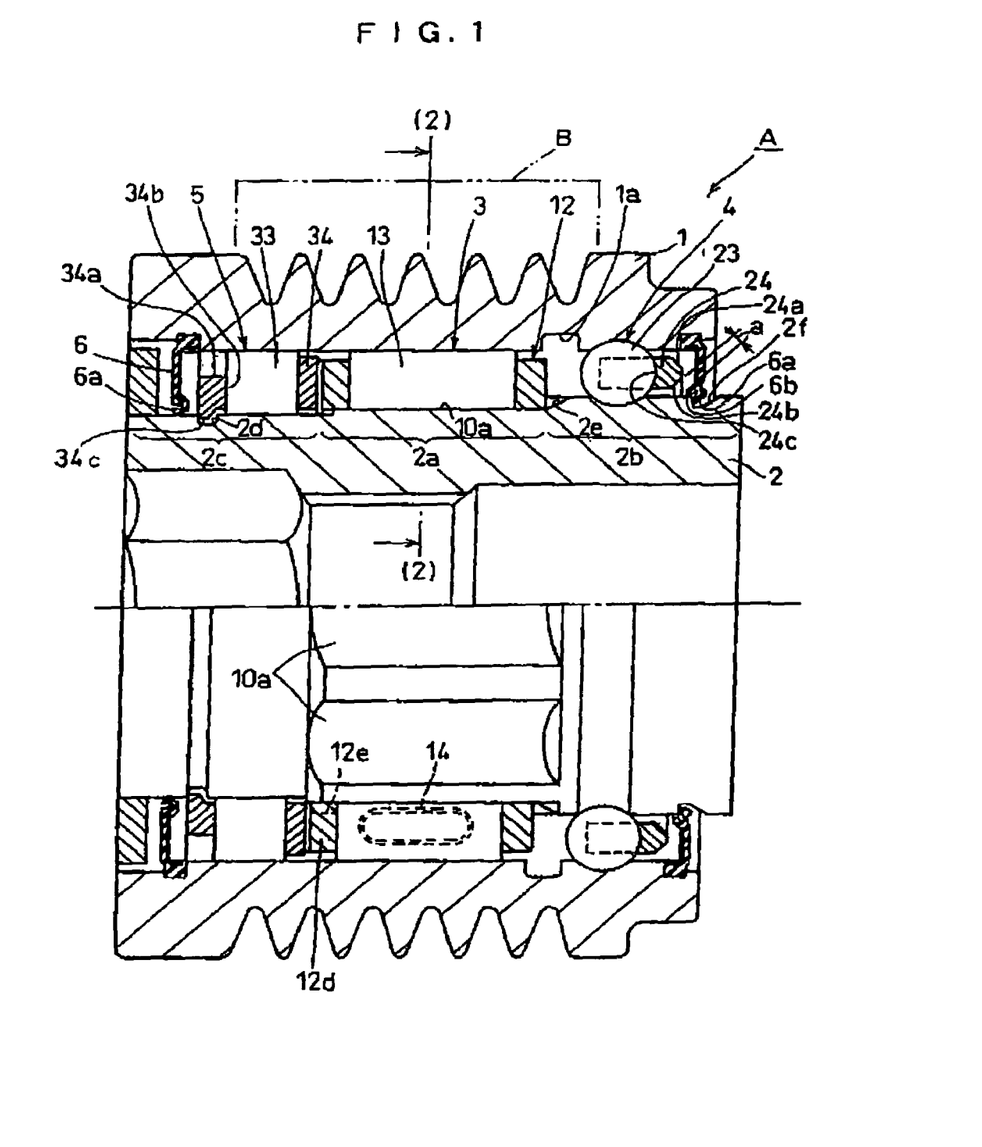
FIG. 1 is a vertical sectional view of a pulley unit according to a best mode for carrying out the present invention.
Figure 2:
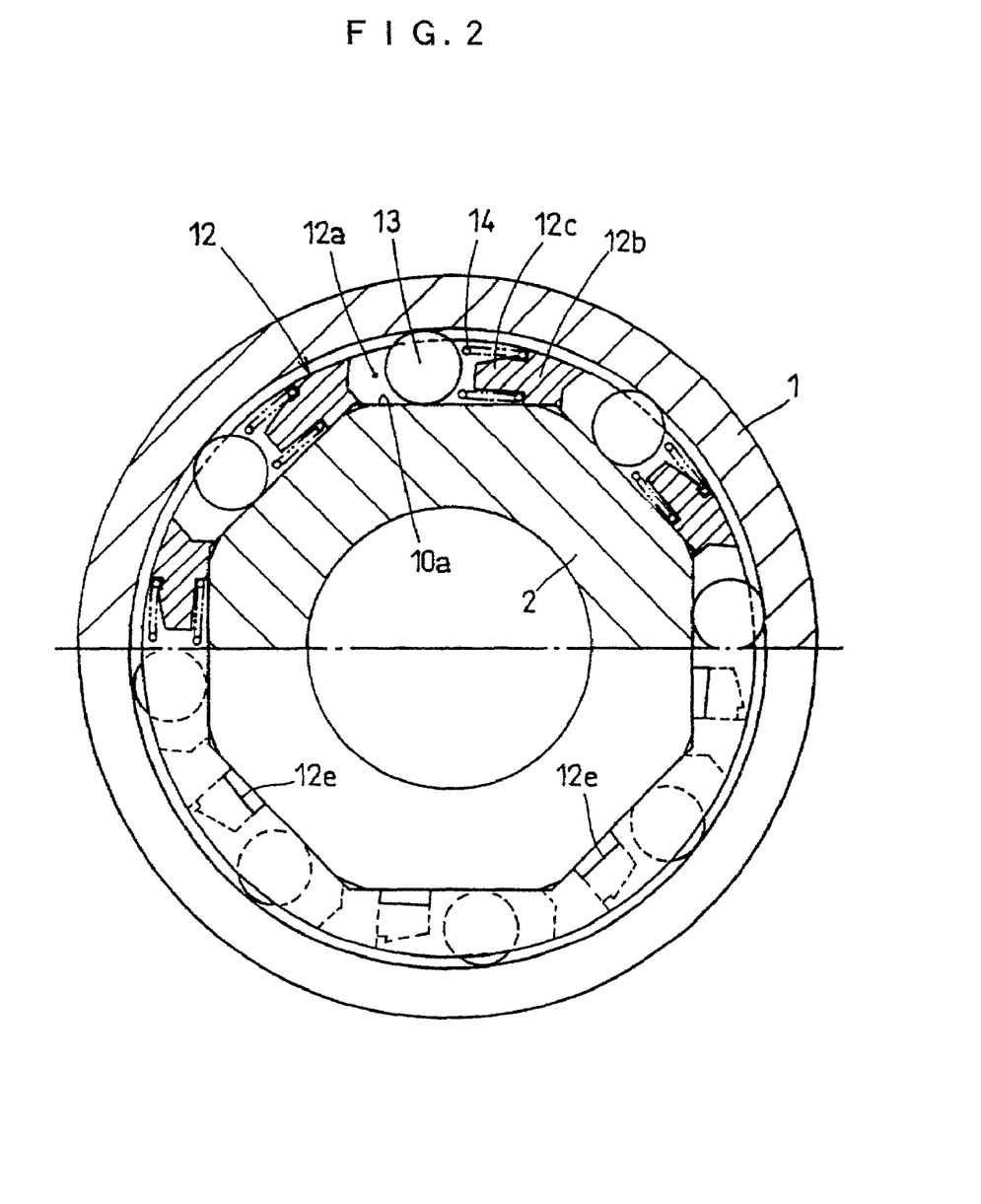
FIG. 2 is a sectional view along a arrow of (2)—(2) in FIG. 1.
Figure 3:
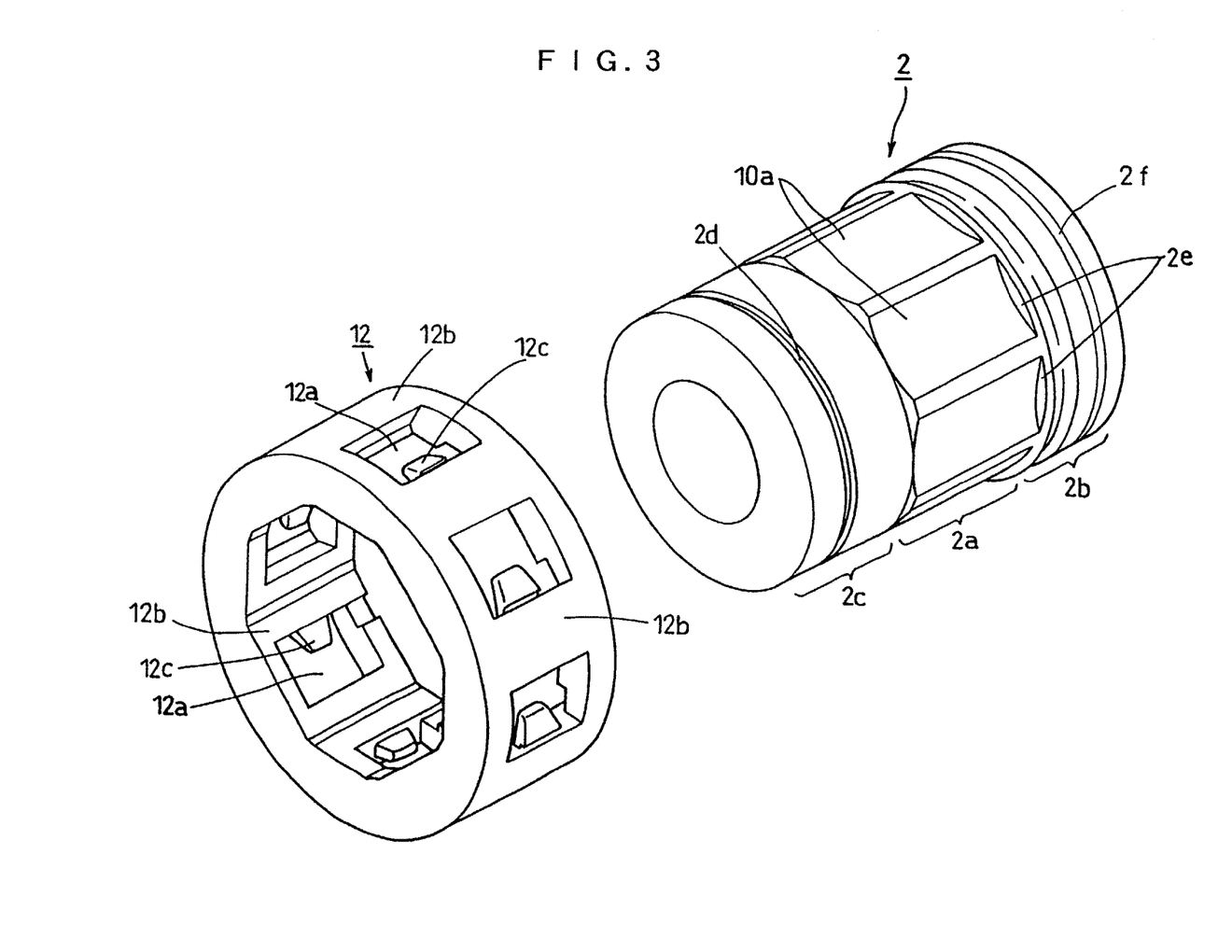
FIG. 3 is a perspective view of a rotor shaft and a retainer of a one-way clutch in FIG. 1.
Figure 4:
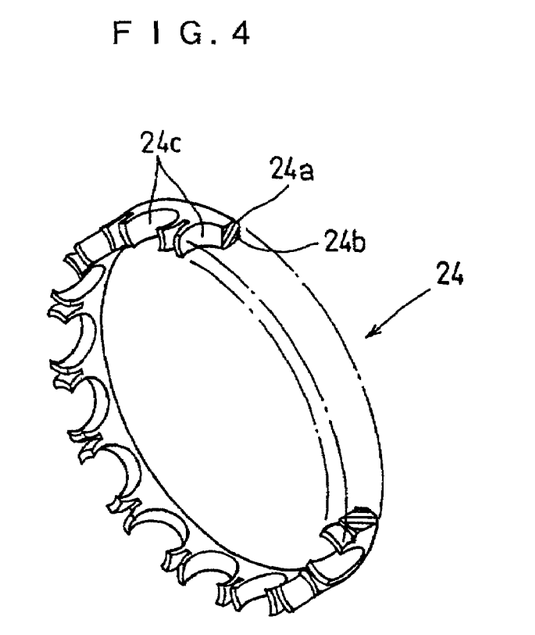
FIG. 4 is a perspective view of a retainer of a ball bearing in FIG. 1.
Figure 5:
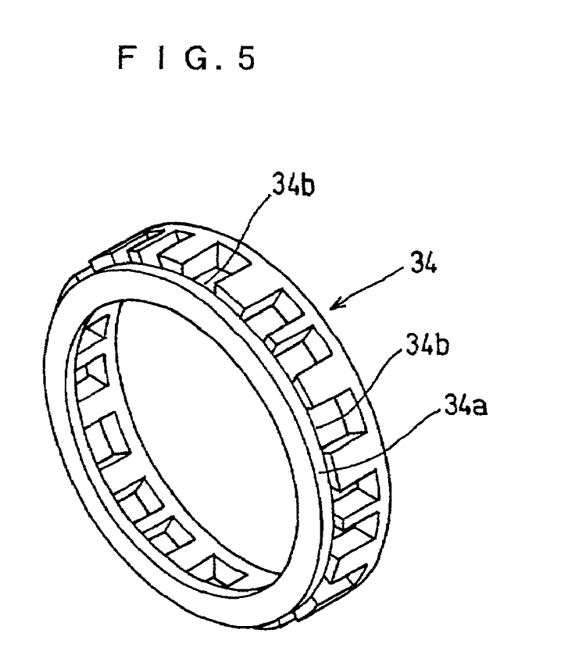
FIG. 5 is a perspective view of a retainer of a roller bearing in FIG. 1.

FIGS. 1 to 5 shows the best mode for carrying out the invention, wherein FIG. 1 is a vertical sectional view of a pulley unit according to a best mode for carrying out the present invention, FIG. 2 is a sectional view along a arrow of (2)—(2) in FIG. 1, FIG. 3 is a perspective view of a rotor shaft and a retainer of a one-way clutch in FIG. 1, FIG. 4 is a perspective view of a retainer of a ball bearing in FIG. 1 and FIG. 5 is a perspective view of a retainer of a roller bearing in FIG. 1.

In the illustrated example, a pulley unit A includes a pulley 1, a rotor shaft 2, a one-way clutch 3, a ball bearing 4 and a roller bearing 5 as rolling bearings, and a seal ring 6.

The hollow shaft 2 of the pulley unit A serves as an inner ring of each of the one-way clutch 3, the ball bearing 4 and the roller bearing 5. The pulley 1 of the pulley unit A serves as an outer ring of each of the one-way clutch 3, the ball bearing 4 and the roller bearing 5.

The pulley 1 is rotated by a crankshaft of an automobile engine through a V-ribbed belt B. An outer periphery of the pulley 1 is formed with corrugated grooves around which the V-ribbed belt B is wound.

An axially one end region of an inner diametrical surface of the pulley 1 is formed with an raceway groove in which balls 23 of the ball bearing 4 are interposed. The ball bearing 4 is a deep-slot ball bearing.

The rotor shaft 2 is a hollow shaft body, and is concentrically disposed in an inner diameter side of the pulley 1 and in a relatively rotatable relationship with the pulley 1. The rotor shaft 2 is fixed to an input shaft (e.g., a rotor of an alternator) of an auxiliary machine of an automobile engine (not shown).

On an outer diametrical surface of the rotor shaft 2, a circumference of an axially intermediate region 2*a* is formed at its several portions with flat cam surfaces 10*a* of the one-way clutch 3. On the outer diametrical surface of the rotor shaft 2, axially opposite side regions 2*b* and 2*c* are formed with inner ring raceways of the ball bearing 4 and the roller bearing 5. The region 2*a* of the rotor shaft 2 is formed into an octagon, and the opposite side regions 2*b* and 2*c* are formed circular.

In the rotor shaft 2, an outer diameter size of the region 2*b* which is an inner ring raceway of the ball bearing 4 is set larger than an outer diameter size of the region 2*c* which is an inner ring raceway of the roller bearing 5. With this design, it is possible to easily assembly the one-way clutch 3, the ball bearing 4 and the roller bearing 5 in one axial direction in this order between the pulley 1 and the rotor shaft 2.

The region 2*b* of the rotor shaft 2 is formed with an raceway groove in which the balls 23 of the ball bearing 4 is interposed.

The region 2*c* of the rotor shaft 2 is formed with a peripheral groove 2*d*. A diametrically inward ring-like projection 34*c* is provided on an inner diametrical surface of the retainer 34 of the roller bearing 5. The ring-like projection 34*c* is engaged in the peripheral groove 24 of the rotor shaft 2. With this design, the retainer 34 is positioned in the axial direction.

The one-way clutch 3 is interposed in substantially axial central portion of the opposed annular space between the inner diametrical surface of the pulley 1 and the outer diametrical surface of the rotor shaft 2. The inner ring raceway of the one-way clutch 3 is constituted by the outer diametrical surface of the rotor shaft 2, and the outer ring raceway of the one-way clutch 3 is constituted by an inner diametrical surface of the pulley 1.

The one-way clutch 3 comprises annular-shaped retainer 12 made of synthetic resin, a plurality of rollers 13 as rolling elements, and oval coil springs 14 as resilient members.

The retainer 12 is disposed in the annular space and is external mounted in a state of being located in the circumferential and axial directions therein. The retainer 12 includes a plurality of pockets 12*a* which pass through the retainer 12 from inside to outside corresponding to the cam surfaces 10*a* of the region 2*a* of the rotor shaft 2. An axial column 12*b* exists between the adjacent pockets 12*a* in the circumferential direction.

The rollers 13 of the one-way clutch 3 are accommodated in the pockets 12*a* of the retainer 12 one each in a state in which the rolling range in the circumferential direction is restrained.

Each of the coil springs 14 of the one-way clutch 3 is mounted to a projection 12*c* projecting from an inner wall surface of each of the columns 12*b* of the retainer 12, and pushes the roller 13 toward a narrow side (lock side) of a wedge-like space formed by a cam surface 10*a* and an inner diametrical surface of the pulley 1.

The inner diametrical surface of the retainer 12 of the one-way clutch 3 is formed into a shape which coincides and fits to the octagonal outer diametrical surface of the axially intermediate region 2*a* of the rotor shaft 2. With this design, the retainer 12 is prevented from being rotated in the circumferential direction with respect to the rotor shaft 2.

A tapered step 2*e* is mounted between the cam surface 10*a* of the intermediate region 2*a* and a large-diameter region 2*b* of the rotor shaft 2.

The retainer 12 of the one-way clutch 3 is prevented from moving toward the ball bearing 4 by the step 2*e*. The retainer 12 is also prevented from moving toward the roller bearing 5 by a retainer 34 of the roller bearing 5 that is positioned to rotor shaft 2 in the axial direction.

As rolling bearings, the ball bearing 4 and the roller bearing 5 are interposed one each on axially opposite sides of the one-way clutch 3 in opposed annular space of the inner diametrical surface of the pulley 1 and the outer diametrical surface of the rotor shaft 2.

The inner ring raceway of the ball bearing 4 is constituted by the outer diametrical surface of the region 2*b* of the rotor shaft 2, and the outer ring raceway of the ball bearing 4 is constituted by the inner diametrical surface of the pulley 1. The ball bearing 4 is a general deep-slot ball bearing comprising a plurality of the balls 23 as rolling elements and a coronary retainer 24 for holding the balls 23. The retainer 24 of the ball bearing 4 is made of resin.

The inner ring raceway of the roller bearing 5 is constituted by the outer diametrical surface of the region 2*c* of the rotor shaft 2, and the outer ring raceway of the roller bearing 5 is constituted by the inner diametrical surface of the pulley 1. The roller bearing 5 is a cage-and-roller comprising a plurality of rollers 33 as rolling elements and a retainer 34 for holding the rollers 33. The retainer 34 of the roller bearing 5 is made of resin.

A seal ring 6 is mounted to axially outer ends of the ball bearing 4 and the roller bearing 5 in the annular space. The seal ring 6 is in a contact form, and an elastic body is mounted to an outer periphery of an annular core of the seal ring 6. One end of the elastic body of the seal ring 6 is fixed to the inner diametrical surface of the pulley 1, and the other end abuts against the outer diametrical surface of the rotor shaft 2 as a seal ring lip 6*a*. Various seal ring lips 6*a* exist other than the above type.

According to the pulley unit A having the structure described above, the one-way clutch 3 is brought into the lock state or the free state in accordance with a difference in rotation speed between the pulley 1 and the rotor shaft 2 so as to transmit power from the pulley 1 to the rotor shaft 2 or to cut of the transmission of the power.

When the one-way clutch 3 is brought into the free state, the rotor shaft 2 keeps rotating by a rotation inertial force of its own.

Next, features of the present embodiment will be explained.

The retainers 24 and 34 of the ball bearing 4 and the roller bearing 5 respectively have annular portions facing to the seal rings 6. The annular portions of the retainers 24 and 34 have outer diameter sides 24*a* and 34*a* reduced in diameter.

With the diameter-reducing structure of the outer diameter sides 24*a* and 34*a* of the retainers 24 and 34, a storage volume for storing the lubricating oil in the annular space formed by the opposed pulley 1 and the rotor shaft 2 in the diametrical direction is increased.

In this case, the outer diameter sides 24*a* and 34*a* may be reduced in diameter over the entire circumference of the outer diametrical surfaces of the retainers 24 and 34, or may be reduced in diameter partially. In this structure, the outer diameter side 24a is one or more notches or recesses with respect to the circumferential direction of the outer diametrical surface of the retainer 24, and the outer diameter side 34a is one or more recesses with respect to the outer diametrical surface of the retainer 34.

A portion of a region of the inner diametrical surface of the pulley 1 between the axial directions of the one-way clutch 3 and the ball bearing 4 is provided with a recess 1a which increases the storage volume for the lubricating oil in the annular space. The recess 1a may be formed annularly over the entire periphery of the inner diametrical surface of the pulley 1, or may be one or more separated recesses.

According to the pulley unit A, the storage space for the lubricating oil in the annular space between the pulley 1 and the rotor shaft 2 is increased by the outer diameter sides 24a and 34a and the recess 1a. With this design, it is possible to hold and store more lubricating oil which has moved toward the outer diameter side of the annular space by the rotation centrifugal force generated by the relative rotation between the pulley 1 and the rotor shaft 2. As a result, lubricating oil is restrained from leaking outside, and the environment in which the lubricating oil is prone to be deteriorated is eliminated. Therefore, the ability of the pulley unit A is enhanced.

The outer diameter sides 24a and 34a are provided outer ends of the retainers 24 and 34 opposed to each of the seal rings 6 in the axial direction. With this design, the lubricating oil storage space in the vicinity of the seal rings 6 is widened and thus, the lubricating oil which moved toward the outer diameter side by the rotation centrifugal force is effectively prevented from leaking from the seal rings 6.

In the retainer 24 of the ball bearing 4, the outer diameter side 24a of the annular portion facing to the seal ring 6 is formed into a taper structure in which its diameter is gradually decreased toward axially outer end.

In the retainer 24 of the ball bearing 4, an inner diameter side 24b of the annular portion facing to the seal ring 6 is formed into a taper structure in which its diameter is gradually increased toward axially outer end.

The lubricating oil located on the inner diameter side between the seal ring 6 and the ball bearing 4 moves toward the outer diameter side of the annular space by the rotation centrifugal force caused by relative rotation between the pulley 1 and the rotor shaft 2. When the lubricating oil moves in this manner, since the inner diameter side 24b on the inner diameter side of the retainer 24 of the ball bearing 4 is tapered toward the axially inner end, the lubricating oil is moved smoothly toward the outer diameter side along the taper surface of the inner diameter side 24b. The lubricating oil which moved in this manner is stored in the storage space smoothly by the taper structure of the outer diameter side 24a on the outer diameter side of the retainer 24 of the ball bearing 4. A reference number 24c represents a pocket which accommodates the balls 23.

As a result, in the pulley unit A, the lubricating oil is more effectively prevented from leaking from the seal ring 6, the environment in which the lubricating oil is prone to be deteriorated is eliminated, and its ability is enhanced.

A seal ring lip 6a of the seal ring 6 on the region 2b is provided as a main seal ring lip extending toward the center along the diametrical direction. A seal ring lip diagonally extending inward of the ball bearing 4 from a root of the main seal ring lip 6a is provided as an auxiliary seal ring lip 6b.

The illustrated opposing distance a between the inner diameter side 24b and the auxiliary seal ring lip 6b is preferably at least 0.6 mm.

If the opposing distance a is set to at least 0.6 mm, when rotation centrifugal force is applied to the pulley 1 or the rotor shaft 2, the lubricating oil can smoothly move from the annular gap between the tapered inner diameter side 24b and the auxiliary seal ring lip 6b, which is preferable.

In this case, the main seal ring lip 6a enters a peripheral groove 2f provided in the region 2b in the outer diametrical surface of the rotor shaft 2.

The sealing amount of the lubricating oil in the pulley unit A was increased by about 20% as compared with that of the prior art.

Another Embodiment (1) In the case of the above pulley unit A, the inner diametrical surface of the pulley 1 and the outer diametrical surface of the rotor shaft 2 respectively constitute the outer ring raceway and the inner ring raceway of each of the one-way clutch 3, the ball bearing 4 and the roller bearing 5. The present invention is not limited to such raceway structure.

For example, it is possible to employ a mode in which the outer ring and the inner ring of the one-way clutch 3 are extended toward the axially opposite sides, and the extended outer ring and the inner ring function as outer ring and inner ring of both the bearings 4 and 5. Alternatively, each of the one-way clutch 3, the ball bearing 4 and the roller bearing 5 may include independent outer ring and inner ring.

(2) The present invention is not limited to the diametrically-reduced structure of the outer diameter sides 24a and 34a of the retainers 24 and 34 of the ball bearing 4 and the roller bearing 5 in the above embodiment. The invention is applied to all pulley units having portions which are reduced in diameter by any method.

(3) In the case of the above pulley unit A, one or more of the plurality of balls 23 accommodated in the pocket 24c of the retainer 24 of the ball bearing 4 are made of resin including lubricating oil. The lubricating oil may gradually ooze from the balls 23.

In this structure, due to limited space of the opposed annular space between the inner diametrical surface of the pulley 1 and the outer diametrical surface of the rotor shaft 2, the width of the lubricating oil storage space is limited by the outer diameter sides 24a and 34a, the lubricating oil is leaked slightly, and when there is tendency that the lubricating oil will be lacking in the long term, the shortage of the lubricating oil can preferably be avoided, and the ability of the pulley unit can preferably be enhanced.

In this case, the number of balls 23 made of resin including the lubricating oil may be determined experimentally in accordance with the shortage state of the lubricating oil.

Figure 6:
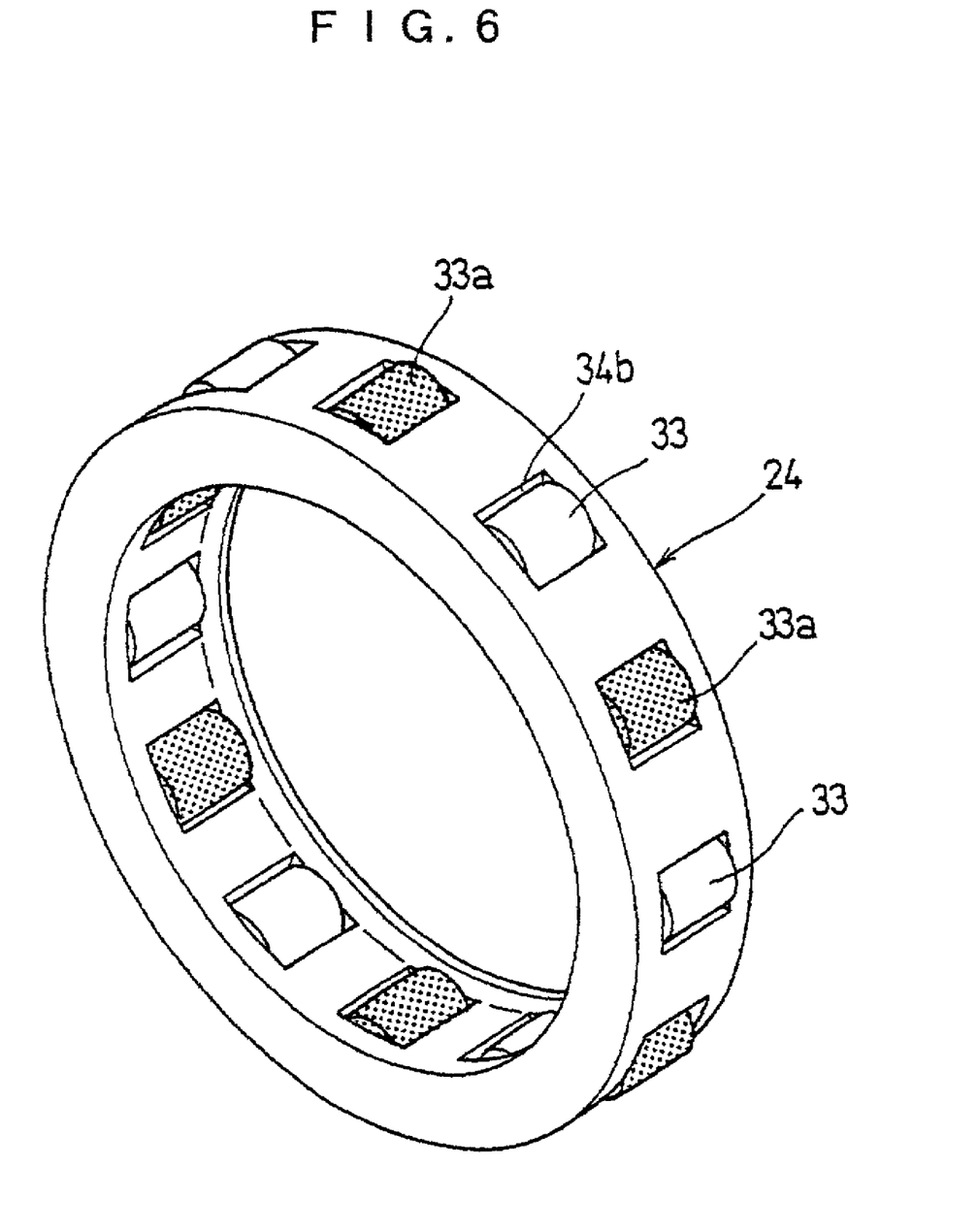
FIG. 6 is a perspective view of a retainer of a roller bearing in a pulley unit according to another mode for carrying out the invention.

The annular space is common for the one-way clutch 3, the ball bearing 4 and the roller bearing 5. Therefore, other than the structure in which the plurality of balls 23 accommodated in the pocket 24c of the retainer 24 of the ball bearing 4 are made of resin including lubricating oil, the rollers 33a made of resin including the lubricating oil may rollably be accommodated in one or more pockets 34b of the retainer 25 of the roller bearing 5 as shown in FIG. 6. In this case, this structure may be applied to only one side of or both sides of the ball bearing 4 and the roller bearing 5 experimentally in accordance with the shortage state of the lubricating oil.

Pockets for accommodating lubricating oil impregnating bodies made of resin having lubricating oil may be provided in the retainer columns of the retainers 24 and 34 of the ball bearing 4 and the roller bearing 5. This lubricating oil impregnating body may be formed into a ball shape or a roller shape such that the body can roll.

Figure 7:
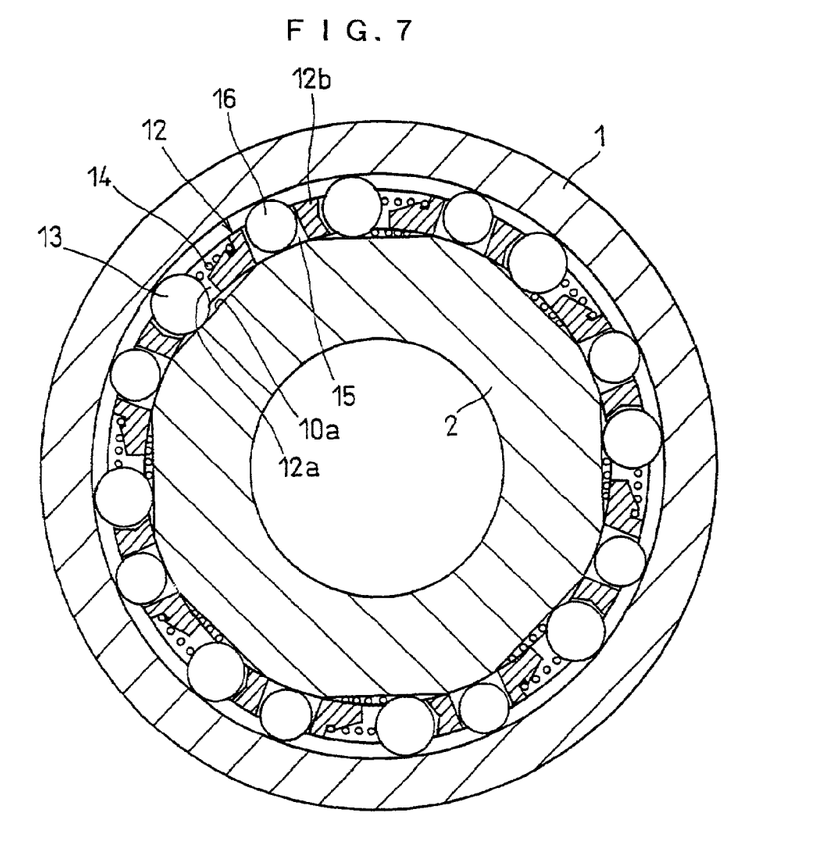
FIG. 7 is a sectional view corresponding to FIG. 2 showing a pulley unit according to another mode for carrying out the invention.
Figure 8:
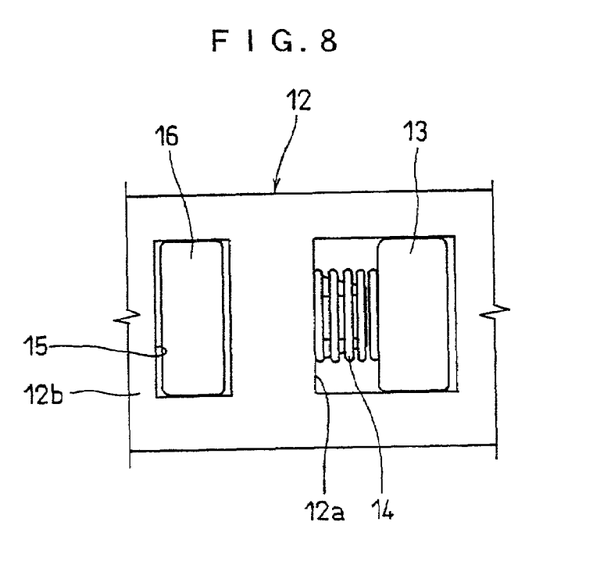
FIG. 8 is a partial plan development view of the retainer of a one-way clutch in FIG. 7.

Further, as shown in FIGS. 7 and 8, if a pocket 15 for accommodating, in rolling manner, a lubricating oil impregnating body made of resin including lubricating oil is provided in the retainer column 12b of the retainer 12 of the one-way clutch 3 and the lubricating oil impregnating body 16 is accommodated in the pocket 15, the shortage of lubricating oil can effectively be eliminated and a preferable result can be obtained. This lubricating oil impregnating body 16 may be formed into a roller shape such that it can roll.

Figure 9:
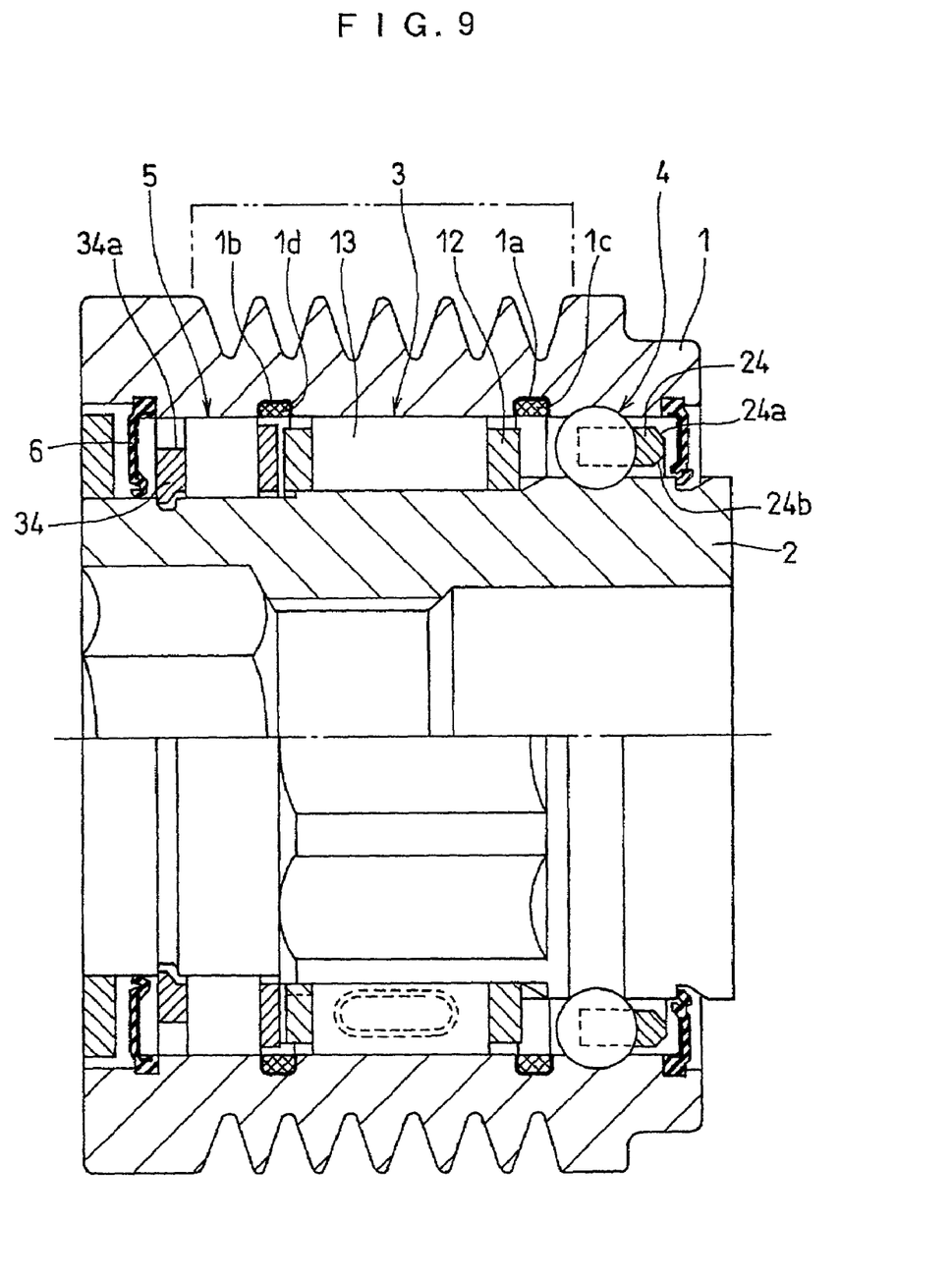
FIG. 9 is a vertical sectional view of a pulley unit according to another mode for carrying out the invention.

Further, in the above embodiment, the annular recess 1a for increasing the storage volume of the lubricating oil is provided, the lubricating oil impregnating body may be accommodated and held in the annular recess 1a. As shown in FIG. 9, an annular recess 1b like the annular recess 1a may be provided in a region of the inner diametrical surface of the pulley 1 between the one-way clutch 3 and the roller bearing 5 in the axial direction, and lubricating oil impregnating bodies 1c and 1d may be accommodated and held in both the annular recesses 1a and 1b. With this structure, the shortage of the lubricating oil can more effectively overcome, which is preferable. This annular recess 1b is not limited to an annular shape, and may be a plurality of separately formed recesses.

The resin including the lubricating oil in each of the one-way clutch 3 mentioned above, the ball bearing 4, the roller bearing 5 and the annular recesses 1a and 1b comprises a resin frame in which the lubricating oil is solidified so that the lubricating oil is oozed from the resin frame.

Examples of this resin are ultra high molecular weight polyethylene, polypropylene, polymethyl pentene. Among them, the ultra high molecular weight polyethylene is superior in mechanical nature and thus, it can be used preferably. As this ultra high molecular weight polyethylene, one having average molecular mass of about 1,000,000 to 6,000,000, especially 2,000,000 or more and having melting point of about 100° C. to 400° C. is preferable.

In the resin mentioned above, conventionally known various addition agents such as antioxidant, thermo-stabilizing agent and coloring agent may be mixed with the same rate as that of the prior art. It is preferable that the resin is supplied as powder.

A particle diameter of the resin is not specially limited, but it is usually preferable that the average particle diameter is about 5 μm to 10 μm, and more preferably, about 10 μm to 30 μm.

The conventionally known lubricating oil can be used, stable lubricating oil whose resin's mechanical nature is not deteriorated by heating when the resin is solidified can be preferably used.

Examples of the lubricating oil are mineral oil, poly-α-olefin oil, diester oil, holyall ester oil, alkyl diphenyl ether oil, silicone oil, paraffin oil, fluorine oil and the like.

Various addition agents can be added to the lubricating oil so as to enhance characteristics such as lubricity, stability and the like. One or more of the lubricating oils described above can be used.

To appropriately keep the lubricating oil, the amount of the lubricating oil is set to 65 weight % to 20 weight % with respect to 35 weight % to 85 weight % of resin. In this amount, if more than 65 weight % lubricating oil is mixed, the lubricating oil keeping ability of the resin is relatively lowered, and if the less than 20 weight % of lubricating oil is mixed, the lubricating oil keeping ability becomes relatively large.

Therefore, the range described above is preferable as the amount of lubricating oil.

(4) In the case of the above embodiment, at least one of the retainers 12, 24 and 34 of the one-way clutch 3, the ball bearing 4 and the roller bearing 5 may be made of resin having the lubricating oil.

The resin and the lubricating oil may be made of mixture of the same resin and lubricating oil as those of (3) described above.

(5) In the pulley unit mentioned above, studies for enhancing the seal ring ability of the seal ring 6 were made, and it found that if acrylic resin having excellent heat resistance is used instead of nitrile-butadiene rubber (NBR) which was generally used for the seal ring 6, the ability of the seal ring 6 could further be enhanced.

The present inventor researched concerning this matter. According to the research, it was found that in the case of this pulley unit, in order to enhance the electric power generation efficiency while keeping the rotation of the rotor of the alternator at high rotation region irrespective of rotation variation of the crankshaft of the engine, if the number of rotation of the crankshaft was lowered, the one-way clutch 3 was brought into the free state, and the rotor shaft 2 was allowed to keep rotating by the rotation inertial force irrespective of deceleration of the pulley 1 and therefore, the one-way clutch 3 was heated by skid of the rollers 13 of the one-way clutch 3, and its heat was transmitted to the seal ring 6 and as a result, if the conventional NBR was used, thermosetting was generated in the seal ring 6, the lubricating oil is prone to be leaked.

Thereupon, the present inventor used the acrylic resin having excellent heat resistance instead of the NBR, the thermosetting described above could be prevented from being generated in the seal ring 6, and the seal ring ability could be maintained or improved.

As resin used instead of the NBR, the acrylic resin is most preferable, but the resin is not limited to this, and any resin having excellent heat resistance can prevent the thermosetting from being generated and can maintain the seal ring ability.

(6) The present invention is not limited to detailed structure of the one-way clutch 3, the ball bearing 4 and the roller bearing 5 in the above embodiment.

INDUSTRIAL APPLICABILITY

The pulley unit of the present invention can be mounted to an auxiliary machine which is driven by a crankshaft of an engine of an automobile or the like through a belt. Examples of the auxiliary machine are an air conditioner compressor of an automobile, a water pump, an alternator, a cooling fan and the like.

The invention claimed is:

1. A pulley unit comprising:
a pulley;
a shaft body concentrically disposed inside of an inner diametrical surface of said pulley and in a relatively rotatable relationship with said pulley;
a one-way clutch interposed in an annular space between the inner diametrical surface of said pulley and an outer diametrical surface of said shaft body;

at least one rolling bearing disposed in said annular space, said at least one rolling bearing including a roller bearing on at least axially one side of said one-way clutch; and seal rings disposed on each of axially one end and axially other end of said annular space for sealing said annular space;

said inner diametrical surface of said pulley forming an outer ring raceway of each of said one-way clutch and said roller bearing;

said outer diametrical surface of said shaft body forming an inner ring raceway of each of said one-way clutch and said roller bearing;

said one-way clutch and said roller bearing each including a plurality of rollers interposed between said outer ring raceway and the inner ring raceway in the circumferential direction, and a retainer having a plurality of pockets each accommodating said rollers one each;

said retainer of said roller bearing having an annular portion facing to a side of a first seal ring of said seal rings, an outer cylindrical circumferential surface extending axially inward from said annular portion and having a first retainer diameter, a second retainer diameter greater than said first retainer diameter, and at least one radially planar surface extending from said outer cylindrical circumferential surface to said second retainer diameter thereby defining a step between said annular portion and said second retainer diameter, so as to increase a storage volume for lubricating oil between said roller bearing and said first seal ring; and said inner diametrical surface of said pulley between said one-way clutch and a given one of said at least one rolling bearing being provided with a recess which increases said storage volume for the lubricating oil in said annular space.

2. A pulley unit according to claim 1, wherein said rollers of said roller bearing are generally cylindrical in shape.

3. A pulley unit according to claim 1, wherein said at least one rolling bearing further includes a ball bearing comprising an other retainer for holding balls, said other retainer having an annular portion facing to a side of a second seal ring of said seal rings, said annular portion of said other retainer having an inner diameter side tapered so as to gradually increase in diameter toward an axially outer end thereof.

4. A pulley unit according to claim 3, wherein in said other retainer of said ball bearing, said annular portion facing to the side of the second seal ring has an outer diameter side tapered so as to gradually decrease in diameter toward the axially outer end thereof.

5. A pulley unit according to claim 1, wherein at least one of said roller of said at least one roller bearing is made of resin including lubricating oil.

6. A pulley unit, comprising:
a pulley;
a shaft body concentrically disposed inside of an inner diametrical surface of said pulley and in a relatively rotatable relationship with said pulley;
a one-way clutch interposed in an annular space between the inner diametrical surface of said pulley and an outer diametrical surface of said shaft body;
a rolling bearing disposed in said annular space on at least axially one side of said one-way clutch;
seal rings disposed on each of axially one end and axially other end of said annular space for sealing said annular space; and
a lubricating oil-impregnating body;

wherein said inner diametrical surface of said pulley forms an outer ring raceway of each of said one-way clutch and said rolling bearing;

said outer diametrical surface of said shaft body forms an inner ring raceway of each of said one-way clutch and said rolling bearing;

said one-way clutch and said rolling bearing each includes a plurality of rolling elements interposed between said outer ring raceway and the inner ring raceway in the circumferential direction, and a retainer having a plurality of pockets each accommodating said rolling elements one each;

said retainer of said rolling bearing has an annular portion facing to the side of said seal ring, said annular portion having an outer diameter side which is reduced in diameter so as to increase a storage volume for lubricating oil between said rolling bearing and said seal ring;

said inner diametrical surface of said pulley between said one-way clutch and said rolling bearing is provided with a recess which increases said storage volume for the lubricating oil in said annular space; and said lubricating oil-impregnating body is accommodated and held in said recess.

7. A pulley unit, comprising:
a pulley;
a shaft body concentrically disposed inside of an inner diametrical surface of said pulley and in a relatively rotatable relationship with said pulley;
a one-way clutch interposed in an annular space between the inner diametrical surface of said pulley and an outer diametrical surface of said shaft body;
a rolling bearing disposed in said annular space on at least axially one side of the one-way clutch and comprising a retainer for holding rolling elements; and
seal rings disposed on each of axially one end and axially other end of said annular space for sealing said annular space;

wherein said inner diametrical surface of said pulley forms an outer ring raceway of each of said one-way clutch and said rolling bearing;

said outer diametrical surface of said shaft body forms an inner ring raceway of each of said one-way clutch and said rolling bearing;

said one-way clutch and said rolling bearing each include a plurality of rolling elements interposed between said outer ring raceway and said inner ring raceway in the circumferential direction, and include a retainer having a plurality of pockets each accommodating said rolling elements one each; and a recess for increasing a storage volume for lubricating oil in said annular space is provided in said inner diametrical surface of said pulley between said one-way clutch and said rolling bearing.

8. A pulley unit according to claim 7, wherein at least one of said rolling elements of said rolling bearing is made of resin including lubricating oil.

9. A pulley unit, comprising:
a pulley;
a shaft body concentrically disposed inside of an inner diametrical surface of said pulley and in a relatively rotatable relationship with said pulley;
a one-way clutch interposed in an annular space between the inner diametrical surface of said pulley and an outer diametrical surface of said shaft body;

a rolling bearing disposed in said annular space on at least axially one side of the one-way clutch and comprising a retainer for holding rolling elements;

seal rings disposed on each of axially one end and axially other end of said annular space for sealing said annular space; and a lubricating oil impregnating body;

wherein said inner diametrical surface of said pulley forms an outer ring raceway of each of said one-way clutch and said rolling bearing;

said outer diametrical surface of said shaft body forms an inner ring raceway of each of said one-way clutch and said rolling bearing;

said one-way clutch and said rolling bearing each include a plurality of rolling elements interposed between said outer ring raceway and said inner ring raceway in the circumferential direction, and include a retainer having a plurality of pockets each accommodating said rolling elements one each;

a recess for increasing a storage volume for lubricating oil in said annular space is provided in said inner diametrical surface of said pulley between said one-way clutch and said rolling bearing; and said lubricating oil-impregnating body is accommodated and held in said recess.

10. A pulley unit, comprising:

a pulley;

a shaft body concentrically disposed inside of an inner diametrical surface of said pulley and in a relatively rotatable relationship with said pulley;

a one-way clutch interposed in an annular space between the inner diametrical surface of said pulley and an outer diametrical surface of said shaft body;

rolling bearings disposed in said annular space on opposite sides of said one-way clutch;

seal rings disposed on each of axially one end and axially other end of said annular space for sealing said annular space;

said inner diametrical surface of said pulley forming an outer ring raceway of each of said one-way clutch and said rolling bearings;

said outer diametrical surface of said shaft body forming an inner ring raceway of each of said one-way clutch and said rolling bearings;

said one-way clutch and rolling bearings including a plurality of rolling elements interposed between said outer ring raceway and said inner ring raceway in the circumferential direction, and including a retainer having a plurality of pockets each accommodating said rolling elements one each;

at least one of said rolling bearings being a roller bearing, at least one of said retainers corresponding to said roller bearing having an annular portion facing to the side of at least a first seal ring of said seal rings, an outer cylindrical circumferential surface extending axially inward from said annular portion and having a first retainer diameter, a second retainer diameter greater than said first retainer diameter, and at least one radially planar surface extending from said outer cylindrical circumferential surface to said second retainer diameter thereby defining a step between said annular portion and said second retainer diameter, so as to increase a storage volume for lubricating oil between said roller bearing and said first seal ring; and said inner diametrical surface of said pulley between said one-way clutch and at least one of said rolling bearings being provided with a recess which increases a storage volume of lubricating oil in said annular space.

11. A pulley unit according to claim 10, wherein said rolling elements of said roller bearing are generally cylindrical in shape.

12. A pulley unit according to claim 10, wherein an other of said rolling bearings is a ball bearing comprising an other retainer for holding balls, said other retainer including an annular portion facing to a side of a second seal ring of said seal rings, said annular portion having an inner diameter side tapered so as to gradually increase in diameter toward an axially outer end thereof.

13. A pulley unit according to claim 12, wherein said annular portion of said other retainer of said ball bearing has an outer diameter side tapered so as to gradually decrease in diameter toward the axially outer end thereof.

14. A pulley unit, comprising:

a pulley;

a shaft body concentrically disposed inside of an inner diametrical surface of said pulley and in a relatively rotatable relationship with said pulley;

a one-way clutch interposed in an annular space between the inner diametrical surface of said pulley and an outer diametrical surface of said shaft body;

rolling bearings disposed in said annular space on opposite sides of said one-way clutch;

seal rings disposed on each of axially one end and axially other end of said annular space for sealing said annular space; and a lubricating oil impregnating body;

wherein said inner diametrical surface of said pulley forms an outer ring raceway of each of said one-way clutch and said rolling bearings;

said outer diametrical surface of said shaft body forms an inner ring raceway of each of said one-way clutch and said rolling bearings;

said one-way clutch and rolling bearings include a plurality of rolling elements interposed between said outer ring raceway and said inner ring raceway in the circumferential direction, and include a retainer having a plurality of pockets each accommodating said rolling elements one each;

said retainers of said rolling bearings each has an annular portion facing to the side of said seal ring, said annular portion having an outer diameter side reduced in diameter so as to increase a storage volume for lubricating oil between said seal ring opposing in an axial direction; and said inner diametrical surface of said pulley between said one-way clutch and at least one of said rolling bearings is provided with a recess which increases a storage volume of lubricating oil in said annular space;

said lubricating oil-impregnating body is accommodated and held in said recess.

15. A pulley unit, comprising:

a pulley;

a shaft body concentrically disposed inside of an inner diametrical surface of said pulley and in a relatively rotatable relationship with said pulley;

a one-way clutch interposed in an annular space between the inner diametrical surface of said pulley and an outer diametrical surface of said shaft body;

a ball bearing provided on axially one side of the one-way clutch in said annular space;

a roller bearing provided on axially other side of the one-way clutch in said annular space;

seal rings disposed on each of axially one end and axially other end of said annular space for sealing said annular space;

an inner diametrical surface of said pulley forming an outer ring raceway of each of said one-way clutch, the ball bearing and the roller bearing;

said outer diametrical surface of said shaft body forming an inner ring raceway of each of said one-way clutch, said ball bearing and said roller bearing;

said one-way clutch, said ball bearing and said roller bearing each including a plurality of rolling elements interposed between said outer ring raceway and said inner ring raceway in the circumferential direction, and including a retainer having a plurality of pockets each accommodating said rolling elements one each;

said retainers of said ball bearing and said roller bearing each having an annular portion facing to the side of a corresponding one of said seal rings, said annular portions having an outer diameter side reduced in diameter so as to increase a storage volume for lubricating oil between said retainers and said seal rings opposed to the annular portions in the axial direction, said retainer of said roller bearing having an outer cylindrical circumferential surface extending axially inward from said annular portion and having a first retainer diameter, a second retainer diameter greater than said first retainer diameter, and at least one radially planar surface extending from said outer cylindrical circumferential surface to said second retainer diameter thereby defining a step between said annular portion and said second retainer diameter, so as to increase a storage volume for lubricating oil between said roller bearing and said first seal ring; and said inner diametrical surface of said pulley between said one-way clutch and the ball bearing being provided with a recess which increases the storage volume of the lubricating oil in said annular space.

16. A pulley unit according to claim 15, wherein said annular portion of said retainer of said ball bearing has an inner diameter side tapered so as to gradually increase in diameter toward an axially outer end thereof and an outer diameter side tapered so as to gradually decrease in diameter toward said axially outer end.

17. A pulley unit according to claim 15, wherein the outer diametrical surface of said shaft body includes an axially one region where said ball bearing is disposed, an axially intermediate region where said one-way clutch is disposed, and an axially other region where said roller bearing is disposed, each of said regions forms the inner ring raceway of each of the one-way clutch, the ball bearing and the roller bearing, an outer diameter of said axially one region where said ball bearing is disposed, is larger than an outer diameter of said axially other region where said roller bearing is disposed.

18. A pulley unit, comprising:

a pulley;

a shaft body concentrically disposed inside of an inner diametrical surface of said pulley and in a relatively rotatable relationship with said pulley;

a one-way clutch interposed in an annular space between the inner diametrical surface of said pulley and an outer diametrical surface of said shaft body;

a ball bearing provided on axially one side of the one-way clutch in said annular space;

a roller bearing provided on axially other side of the one-way clutch in said annular space;

seal rings disposed on each of axially one end and axially other end of said annular space for sealing said annular space; and a lubricating oil-impregnating body;

wherein said inner diametrical surface of said pulley forms an outer ring raceway of each of said one-way clutch, the ball bearing and the roller bearing;

said outer diametrical surface of said shaft body forms an inner ring raceway of each of said one-way clutch, said ball bearing and said roller bearing;

said one-way clutch, said ball bearing and said roller bearing each include a plurality of rolling elements interposed between said outer ring raceway and said inner ring raceway in the circumferential direction, and include a retainer having a plurality of pockets each accommodating said rolling elements one each;

said retainers of said ball bearing and said roller bearing each have an annular portion facing to the side of said seal ring, said annular portion having an outer diameter side reduced in diameter so as to increase a storage volume for lubricating oil between said seal rings opposed to each other in their axial direction;

said inner diametrical surface of said pulley between said one-way clutch and the ball bearing is provided with a recess which increases the storage volume of the lubricating oil in said annular space; and said lubricating oil-impregnating body is accommodated and held in said recess.

19. A pulley unit comprising:

a pulley;

a shaft body concentrically disposed inside of an inner diametrical surface of said pulley and in a relatively rotatable relationship with said pulley;

a one-way clutch interposed in an annular space between the inner diametrical surface of said pulley and an outer diametrical surface of said shaft body;

at least one rolling bearing disposed in said annular space, said at least one rolling bearing including a roller bearing on at least axially one side of said one-way clutch; and seal rings disposed on each of axially one end and axially other end of said annular space for sealing said annular space;

said inner diametrical surface of said pulley forming an outer ring raceway of each of said one-way clutch and said roller bearing;

said inner diametrical surface of said pulley being provided with a recess between said one-way clutch and a given one of said at least one rolling bearing which increases said storage volume for the lubricating oil in said annular space;

said outer diametrical surface of said shaft body forms an inner ring raceway of each of said one-way clutch and said roller bearing;

said one-way clutch and said roller bearing each includes a plurality of rollers interposed between said outer ring raceway and the inner ring raceway in the circumferential direction, and a retainer having a plurality of pockets each accommodating said rollers one each;

said retainer of said roller bearing has an annular portion facing to a side of a first seal ring of said seal rings, said annular portion having an outer diameter which is reduced in diameter with respect to a remaining diameter of the retainer thereby defining a step between said outer diameter of said annular portion and said remaining diameter, so as to increase a storage volume for lubricating oil between said roller bearing and said first seal ring.

20. A pulley unit, comprising:

a pulley;

a shaft body concentrically disposed inside of an inner diametrical surface of said pulley and in a relatively rotatable relationship with said pulley;

a one-way clutch interposed in an annular space between the inner diametrical surface of said pulley and an outer diametrical surface of said shaft body;

rolling bearings disposed in said annular space on opposite sides of said one-way clutch; and seal rings disposed on each of axially one end and axially other end of said annular space for sealing said annular space;

said inner diametrical surface of said pulley forming an outer ring raceway of each of said one-way clutch and said rolling bearings, said inner diametrical surface of said pulley being provided with a recess between said one-way clutch and at least one of said rolling bearings which increases a storage volume of lubricating oil in said annular space;

said outer diametrical surface of said shaft body forms an inner ring raceway of each of said one-way clutch and said rolling bearings;

said one-way clutch and rolling bearings include a plurality of rolling elements interposed between said outer ring raceway and said inner ring raceway in the circumferential direction, and include a retainer having a plurality of pockets each accommodating said rolling elements one each;

at least one of said rolling bearings being a roller bearing, at least one of said retainers corresponding to said roller bearing having an annular portion facing to the side of at least a first seal ring of said seal rings, said annular portion having an outer diameter which is reduced in diameter with respect to a remaining diameter of the retainer thereby defining a step between said outer diameter of said annular portion and said remaining diameter, so as to increase a storage volume for lubricating oil between said roller bearing and said first seal ring.

21. A pulley unit, comprising:

a pulley;

a shaft body concentrically disposed inside of an inner diametrical surface of said pulley and in a relatively rotatable relationship with said pulley;

a one-way clutch interposed in an annular space between the inner diametrical surface of said pulley and an outer diametrical surface of said shaft body;

a ball bearing provided on axially one side of the one-way clutch in said annular space;

a roller bearing provided on axially other side of the one-way clutch in said annular space; and seal rings disposed on each of axially one end and axially other end of said annular space for sealing said annular space;

an inner diametrical surface of said pulley forming an outer ring raceway of each of said one-way clutch, the ball bearing and the roller bearing, said inner diametrical surface of said pulley being provided with a recess between said one-way clutch and the ball bearing which increases the storage volume of the lubricating oil in said annular space, said outer diametrical surface of said shaft body forms an inner ring raceway of each of said one-way clutch, said ball bearing and said roller bearing;

said one-way clutch, said ball bearing and said roller bearing each include a plurality of rolling elements interposed between said outer ring raceway and said inner ring raceway in the circumferential direction, and include a retainer having a plurality of pockets each accommodating said rolling elements one each;

said retainers of said ball bearing and said roller bearing each have an annular portion facing to the side of a corresponding one of said seal rings, said annular portions having an outer diameter side reduced in diameter so as to increase a storage volume for lubricating oil between said retainers and said seal rings opposed to the annular portions in the axial direction, said annular portion of said roller bearing having an outer diameter smaller than a remaining diameter of the retainer thereby defining a step between said outer diameter of said annular portion and said remaining diameter.

* * * * *